(12) United States Patent
Wada et al.

(10) Patent No.: US 7,255,160 B2
(45) Date of Patent: Aug. 14, 2007

(54) HEAT EXCHANGER

(75) Inventors: Naoki Wada, Isesaki (JP); Takashi Fujisaki, Isesaki (JP); Yuji Makuta, Tokyo (JP); Mamoru Fukushima, Tokyo (JP)

(73) Assignees: Sanden Corporation, Isesaki-shi, Gunma (JP); Fuji Jukogyo Kabushiki Kaisha, Shinjuku-ku, Tokyo (JP)

( * ) Notice: Subject to any disclaimer, the term of this patent is extended or adjusted under 35 U.S.C. 154(b) by 449 days.

(21) Appl. No.: 10/811,151

(22) Filed: Mar. 29, 2004

(65) Prior Publication Data

US 2005/0022968 A1 Feb. 3, 2005

(30) Foreign Application Priority Data

Apr. 3, 2003 (JP) .............................. 2003-100595

(51) Int. Cl.
F28F 7/00 (2006.01)
H05K 7/20 (2006.01)

(52) U.S. Cl. ...................................... 165/185; 165/80.3

(58) Field of Classification Search ................ 165/153, 165/173, 175–176, 158, 905, 81, 82, 135
See application file for complete search history.

(56) References Cited

U.S. PATENT DOCUMENTS 2,437,452 A * 3/1948 McKinley Baird .......... 165/135
3,415,315 A * 12/1968 Donaldson et al. ......... 165/148
3,489,209 A * 1/1970 Johnson ..................... 165/133
5,067,235 A * 11/1991 Kato et al. ............. 29/890.043
2002/0119335 A1* 8/2002 Nozaki .................... 428/474.9
2002/0144808 A1* 10/2002 Jones ........................ 165/173

FOREIGN PATENT DOCUMENTS

GB 2049149 A * 12/1980
JP 03185279 A * 8/1991

* cited by examiner

Primary Examiner—Tho Duong
(74) Attorney, Agent, or Firm—Baker Botts, L.L.P.

(57) ABSTRACT

A heat exchanger includes a heat exchange core, an introduction tank for introducing a heat transfer medium into the heat exchange core, and a discharge tank for receiving the heat transfer medium discharged from the heat exchange core. Materials used to form the introduction tank and the discharge tank are different from each other. The properties desired for the respective tanks may be attained, and while unnecessary increases in the costs for manufacturing the heat exchanger is may be reduced or avoided, the performance of the heat exchanger may be improved.

9 Claims, 4 Drawing Sheets

HEAT EXCHANGER

BACKGROUND OF THE INVENTION

1. Field of the Invention

The present invention relates to a heat exchanger having a heat exchange core and heat transfer medium introduction and discharge tanks, and more specifically, to a heat exchanger suitable for use as an intercooler.

2. Description of Related Art

A heat exchanger is known, which has a heat exchange core consisting of alternately stacked, heat transfer tubes and fins and in which a introduction tank for introducing heat transfer medium into the heat exchange core and a discharge tank for receiving the heat transfer medium discharged from the heat exchange core are attached to the heat exchange core. For example, such a heat exchanger is described in Japanese Patent Publication No. JP-A-5-1896. Such a heat exchanger may be utilized in various fields, including as a heat exchanger used in a refrigeration circuit for vehicles or as an intercooler for cooling charged gas from a turbocharger or a supercharger. In such a heat exchanger, both tanks generally are formed from a metal, for example, as described in Japanese Patent Publication No. JP-A-9-79787, or from a resin, for example, as described in Japanese Patent Publication No. JP-A-2002-195043, and both tanks are made of the same material.

Generally, when a heat exchanger is mounted on a vehicle, improved performance may be desired in properties, such as pressure resistance, thermal resistance, and sound-proofing capability when compared with heat exchangers used in other fields. For example, in an intercooler, in which the heat transfer medium introduction tank and the discharge tank are attached to a heat exchange core consisting of heat transfer tubes and fins disposed alternately, a high thermal resistance is desired for the introduction tank because a high-temperature, charged gas is introduced to that tank. Therefore, both the introduction tank and the discharge tank have been made of expensive material exhibiting high thermal resistance, thereby achieving a desired thermal resistance for the introduction tank. However, with respect to the discharge tank of such an intercooler, an enhanced sound-proofing capability is desired, rather than high thermal resistance as the introduction tank. If the discharge tank also is made of the same expensive material having a high thermal resistance, the cost of manufacturing the intercooler may increase. Moreover, the properties desired for the introduction tank and the discharge tank, respectively, may not be satisfied sufficiently.

In such a situation, the discharge tank may be coated with a covering material formed from a rubber or a resin in order to improve the sound-proofing capability of the discharge tank. If such a cover material is provided, the cost of the intercooler also may increase because the number of heat exchanger parts and the number of steps in the manufacturing process increase.

SUMMARY OF THE INVENTION

Accordingly, it is an object of the present invention to provide a heat exchanger suitable for use in a vehicle, particularly, one suitable for use as an intercooler. The heat exchanger may achieve improved or optimal properties for the heat transfer medium introduction tank and the discharge tank, which are attached to each end of a heat exchange core, respectively, without increasing of the manufacturing cost or the weight, or both, of the heat exchanger.

To achieve the foregoing and other objects, a heat exchanger according to the present invention is provided. The heat exchanger comprises a heat exchange core, an introduction tank attached to the heat exchange core for introducing a heat transfer medium into the heat exchange core, and a discharge tank attached to the heat exchange core for receiving the heat transfer medium discharged from the heat exchange core. In this heat exchanger, materials used to form the introduction tank and the discharge tank are different from each other.

In the heat exchanger, the introduction tank and the discharge tank are attached to the heat exchange core, for example, at ends of the heat exchange core opposite to each other. The properties desired for the introduction tank and those desired for the discharge tank are different from each other. For instance, when the heat exchanger is an intercooler, a sufficient thermal resistance is desired for the introduction tank, into which a high-temperature, charged gas is introduced. Consequently, it is preferred that a heat conductivity of the material used to form the introduction tank is greater than a heat conductivity of the material used to form the discharge tank. As a result of this configuration, while the cost of the heat exchanger, as a whole, may be reduced, the thermal resistance desired for the introduction tank may be attained. On the other hand, a sound-proofing capability, rather than the above-described thermal resistance, may be desired for the discharge tank of the intercooler. Therefore, in this case, it is preferred that a specific gravity of the material used to form the discharge tank is greater than a specific gravity of the material used to form the introduction tank. By this configuration, while the cost of the heat exchanger, as a whole, may be reduced, the sound-proofing capability desired for the discharge tank may be attained.

The material used to form at least one of the above-described introduction tank and discharge tank is not strictly restricted, and a metal (for example, an aluminum or an aluminum alloy) or a resin may be employed. A polyamide, in particular, an aliphatic polyamide, may be a preferred resin. For example, when the heat exchanger is an intercooler, if the introduction tank is made of polyhexamethylene adipoamide ("66-nylon resin") and the discharge tank is made of polycaprolactam ("6-nylon resin"), while the cost of the heat exchanger, as a whole, may be reduced, both the properties desired for the introduction and discharge tanks, respectively, may be both satisfied.

Further, an inorganic material may be added to the above-described resin(s) used to form the introduction tank or the discharge tank, or both. Nevertheless, the proportion of inorganic material added to the resin is such that the added material does not adversely effect the molding property of the resin. Consequently, a predetermined amount of an inorganic material, for example, glass fibers, may be added.

Applications for the heat exchanger of the present invention are not strictly limited, and heat exchangers of the present invention may be applied for use in various fields, such as heat exchangers used in air conditioning systems for vehicles and intercoolers mounted on vehicles. In particular, heat exchangers according to the present invention are suitable as intercoolers into which charged gas from a turbo-charger or a supercharger may be introduced as a heat transfer medium. The heat exchanger structure also is not strictly limited, and heat exchangers of the present invention may comprise a stacking-type, heat exchange core, in which the heat exchanger core comprises heat transfer tubes and fins, which are stacked alternately.

In the heat exchanger according to the present invention, because the introduction tank and the discharge tank are formed from materials which are different from each other, preferred materials may be selected as the materials for use in forming the respective tanks in consideration of the properties, such as the thermal resistance and the sound-proofing capability desired for the respective tanks. Consequently, while undesirable cost increases, such as those which may occur when the respective tanks are formed from the same material, may be reduced or avoided, the properties desired for the respective tanks may be readily attained, thereby, achieving a high-performance heat exchanger at a reduced cost.

Other objects, features, and advantages of the present invention will be apparent to persons of ordinary skill in the art from the following detailed description of preferred embodiments of the present invention and the accompanying drawings.

BRIEF DESCRIPTION OF THE DRAWINGS

For a more complete understanding of the present invention, the needs satisfied thereby, and the objects, features, and advantages thereof, reference now is made to the following description taken in connection with the accompanying drawings.

DETAILED DESCRIPTION OF PREFERRED EMBODIMENTS

Figure 1:
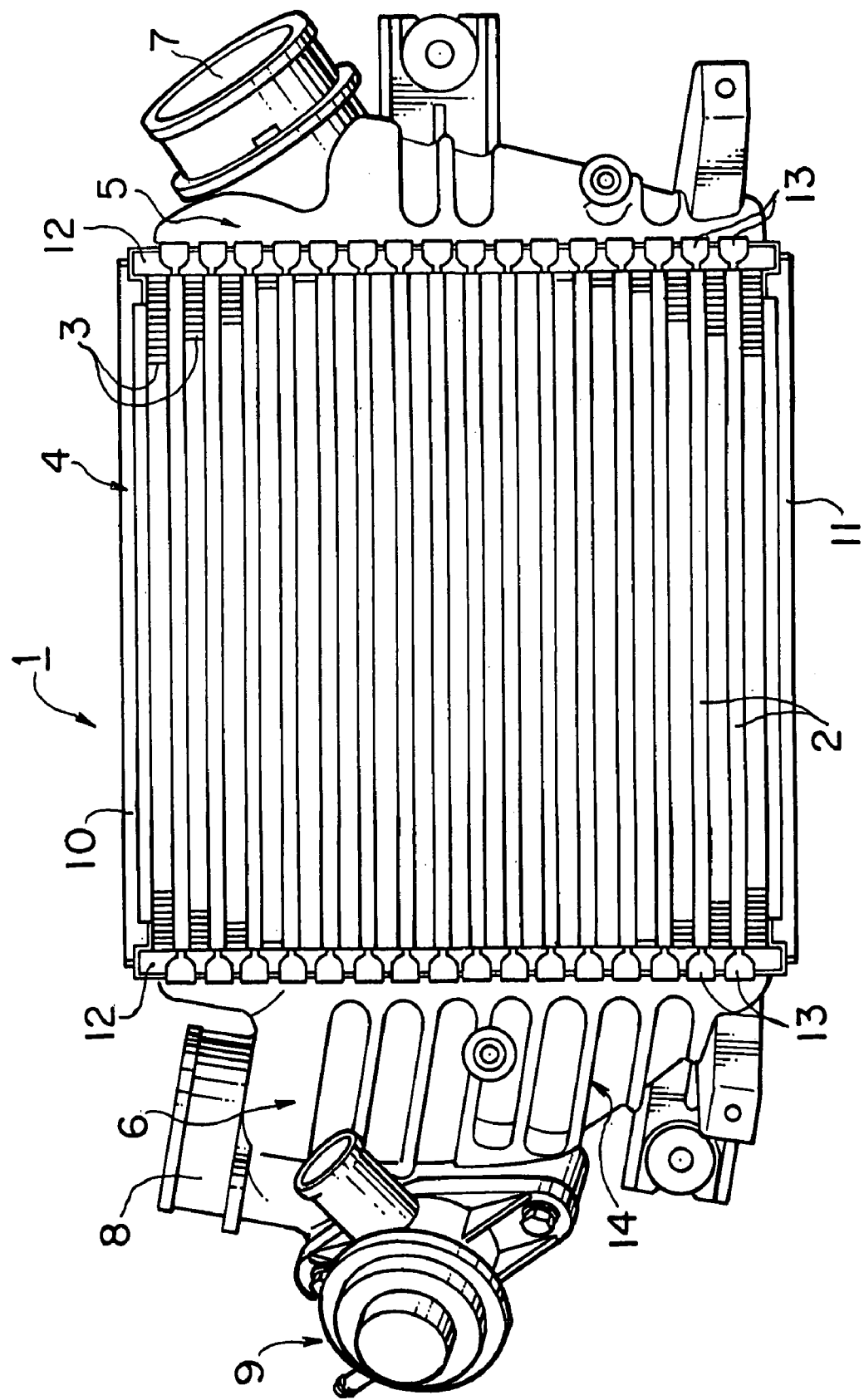
FIG. 1 is an plan view of an inter cooler provided as a heat exchanger according to an embodiment of the present invention.
Figure 2:
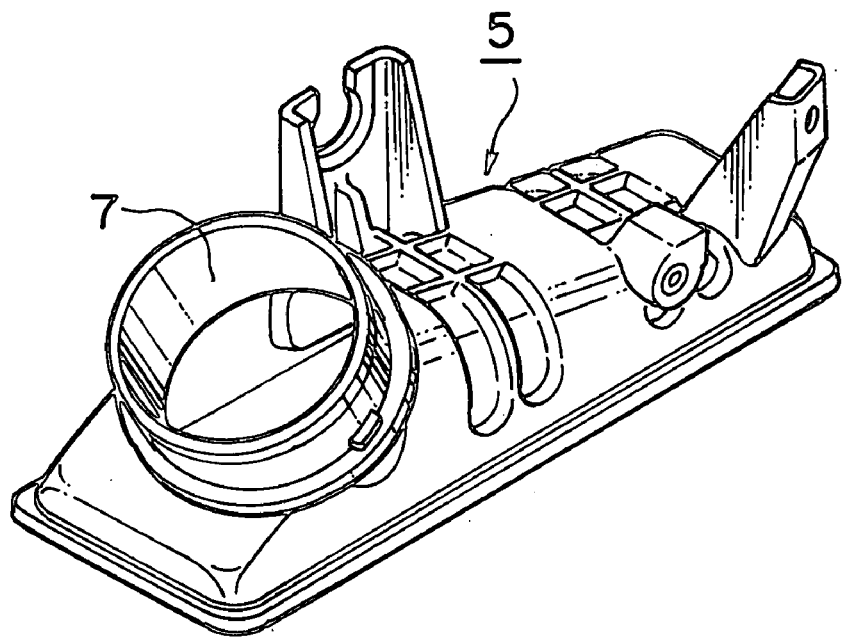
FIG. 2 is a perspective view of an introduction tank of the heat exchanger depicted in FIG. 1.
Figure 3:
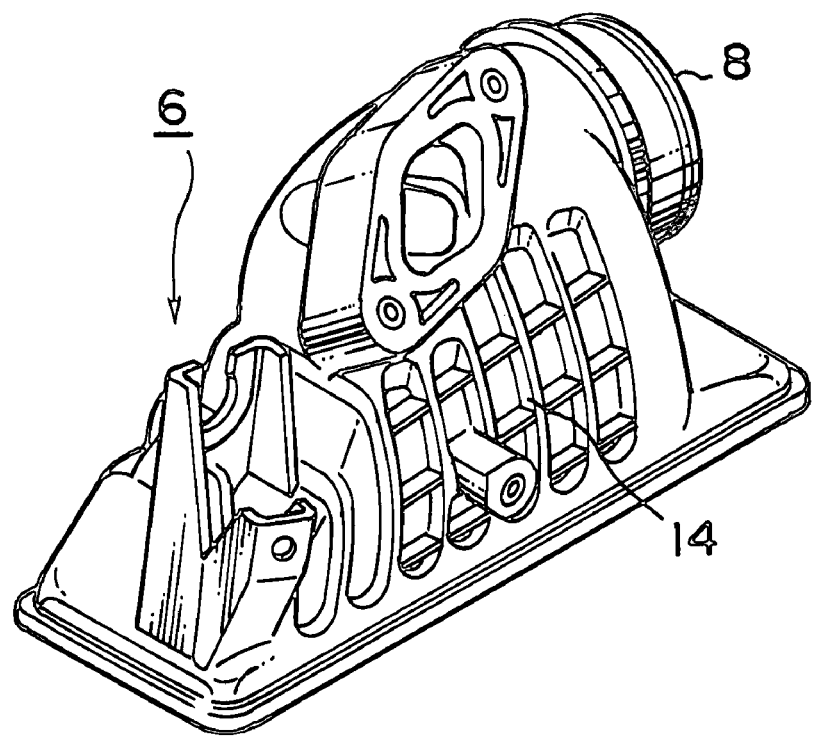
FIG. 3 is a perspective view of a discharge tank of the heat exchanger depicted in FIG. 1.
Figure 4:
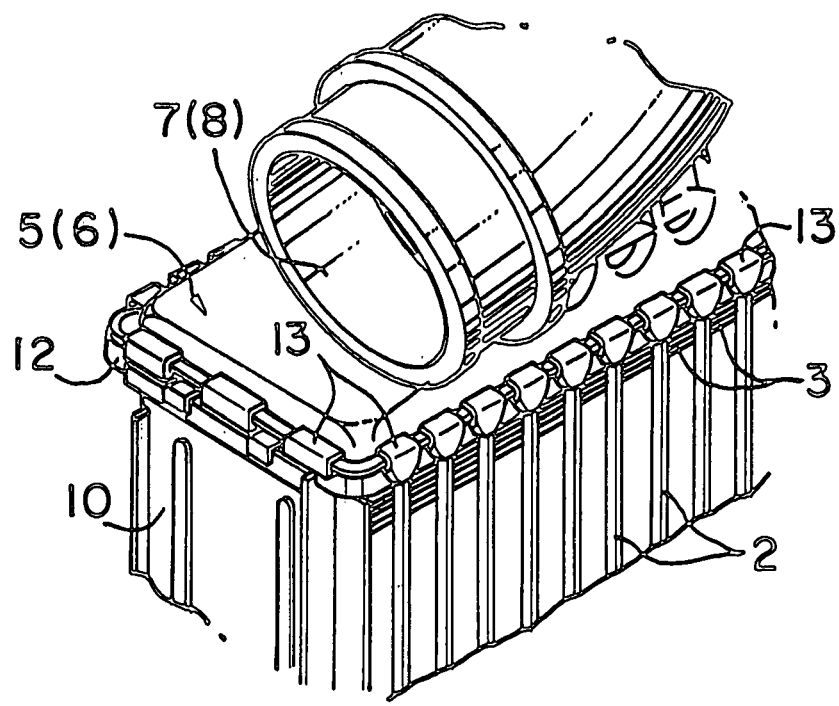
FIG. 4 is a perspective view of a junction portion of a heat exchange core with an introduction tank or a discharge tank of the heat exchanger depicted in FIG. 1.

FIG. 14 depict an intercooler as an embodiment of a heat exchanger according to the present invention. In FIG. 1, an intercooler 1 has a heat exchange core 4 in which heat transfer tubes 2 and fins 3 are alternately stacked. to FIGS. 1 and 4, side plates 10 and 11 are provided on outermost fins 3, respectively, in the stacking directions. On one end of heat exchange core 4 at an open end of heat transfer tubes 2, an introduction tank 5 is attached to heat exchange core 4 for introducing heat transfer medium (in this embodiment, charged gas from a turbo-charger or a supercharger (not shown)) into heat exchange core 4. On the other end of heat exchange core 4 opposite to the above-described end, a discharge tank 6 is attached to the heat exchange core 4 for receiving the heat transfer medium (the charged gas cooled by passage through the portion of the heat exchange core 4) discharged from heat exchange core 4. Both tanks 5 and 6 are fixed to heat exchange core 4 by crimping claws 13 provided on seat plates 12 of the heat exchange core 4.

Introduction tank 5 and discharge tank 6 are made of materials different from each other, as described below.

In intercooler 1, gas charged by a turbo-charger or a supercharger (not shown) is introduced into introduction tank 5 through an introduction port 7. When the charged gas flows into heat transfer tubes 2, heat exchange occurs with outside air passing through heat exchange core 4 to cool the charged gas, and the cooled gas is supplied to an engine (not shown) from discharge tank 6 through a discharge port 8. In discharge tank 6, an air bypass valve 9 is provided in order to prevent damage of the tank 6 due to an increase in the pressure of the charged gas, and a rib structure 14 is provided in order to reduce or eliminate noise due to passage of the heat transfer medium (the charged gas).

Charged gas, the temperature of which has increased as a result of its being compressed, is introduced into introduction tank 5 of intercooler 1. Therefore, it is preferred to use a material to form introduction tank 5 having a sufficient heat conductivity and a sufficient heat radiation property, that is, a material having a high thermal resistance. On the other hand, because the charged gas flowing into discharge tank 6 is cooled by passing it through heat exchange core 4, different properties are desired of the material of discharge tank 6. For example, a sound-proofing capability for reducing or avoiding noise due to the passage of the heat transfer medium is desired, rather than the thermal resistance of the material used to form introduction tank 5. Therefore, a material having a large specific gravity is preferred for discharge tank 6.

In this embodiment, introduction tank 5 is made of a material having a heat conductivity at least greater than the heat conductivity of a material used to form discharge tank 6, and discharge tank 6 is made of a material having a specific gravity at least greater than the specific gravity of a material used to form introduction tank 5. More specifically, introduction tank 5 may be made of polyhexamethylene adipoamide (66-nylon resin, hereinafter, referred to as "66-PA resin"), and discharge tank 6 may be made of polycaprolactam (6-nylon resin, hereinafter, referred to as "6-PA resin"). Further, an inorganic material, such as glass fibers, may be added to either 6-PA resin and 66-PA resin. The content by weight of the inorganic material may be within a range, such that the inorganic content does not adversely effect the molding properties of these resins.

Figure 5:
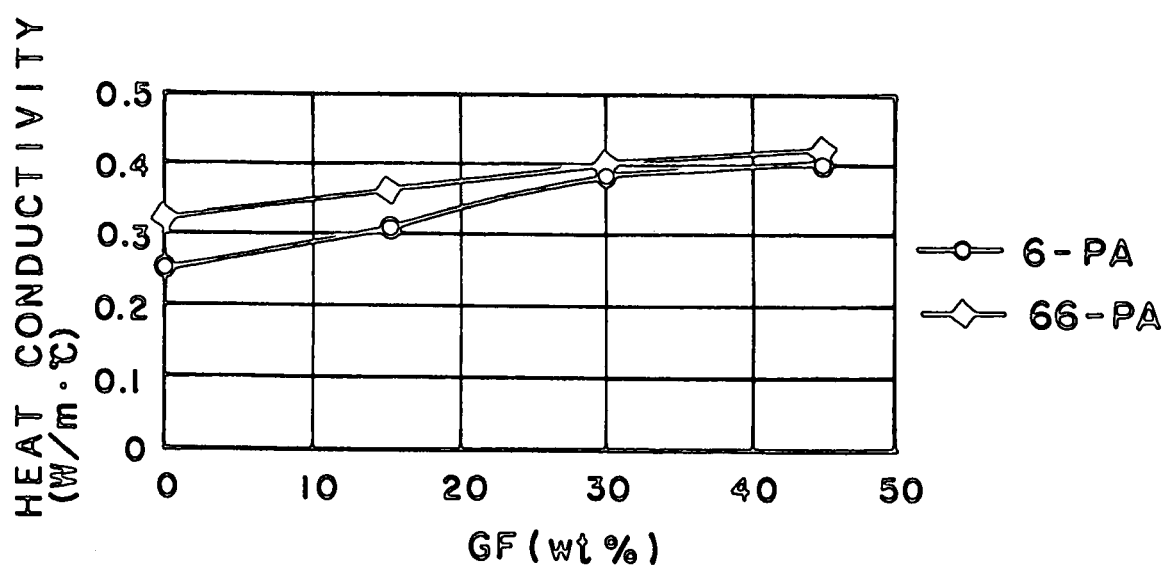
FIG. 5 is a graph showing relationships between heat conductivity and content of glass fibers (GF) in tank materials of 6-nylon (6-PA) resin and 66-nylon (66-PA) resin.

FIG. 5 shows relationships between the glass fibers content, by weight percentage (GF (wt %)) and the heat conductivities (W/m·° C.) in 6-PA resin and 66-PA resin. As is demonstrated by FIG. 5, the heat conductivity of 66-PA resin is greater than the heat conductivity of 6-PA. Therefore, it is understood that 66-PA resin is more suitable as a material for introduction tank 5, than 6-PA resin. Further, the heat conductivity of 66-PA resin increases along with the content of glass fibers. Therefore, in this embodiment, 66-PA resin comprising glass fibers at a content of about 30 wt % is used as the material to form introduction tank 5.

Figure 6:
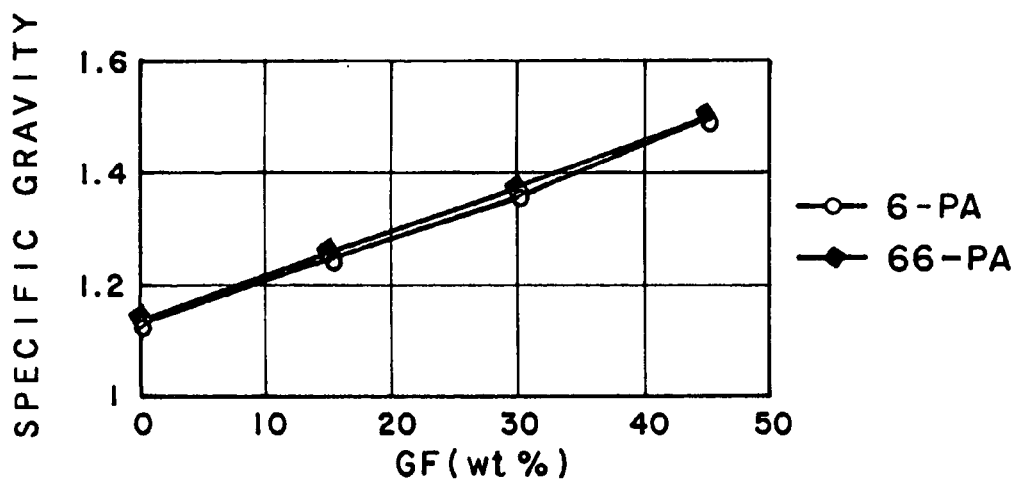
FIG. 6 is a graph showing relationships between specific gravity and content of glass fibers (GF) in tank materials of 6-nylon (6-PA) resin and 66-nylon (66-PA) resin.

FIG. 6 shows relationships between the glass fibers content, by weight percentage, (GF (wt %)) and the specific gravity in 6-PA resin and 66-PA resin. As is demonstrated by FIG. 6, the specific gravity of each of 6-PA resin and 66-PA resin increases correspondingly with increases in the content of glass fibers.

Figure 7:
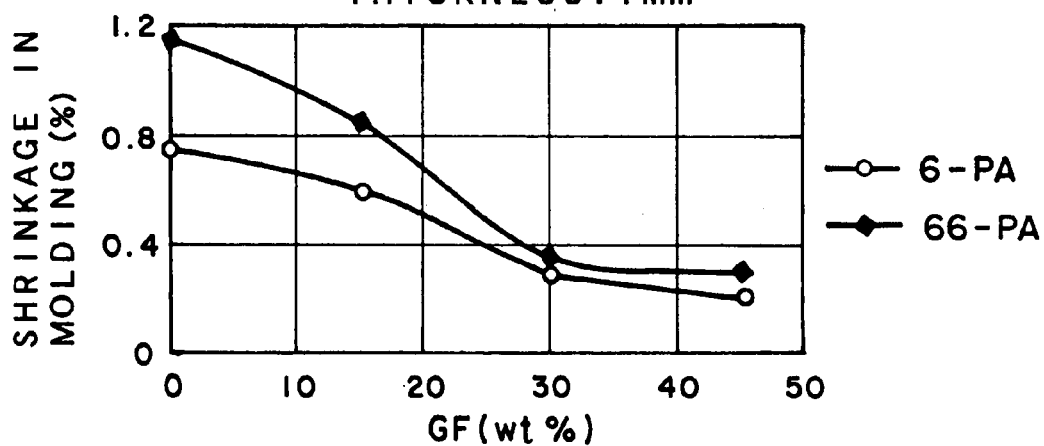
FIG. 7 is a graph showing relationships between shrinkage in molding (when the thickness of the molded object is about 1 mm) and content of glass fibers (GF) in tank materials of 6-nylon (6-PA) resin and 66-nylon (66-PA) resin.
Figure 8:
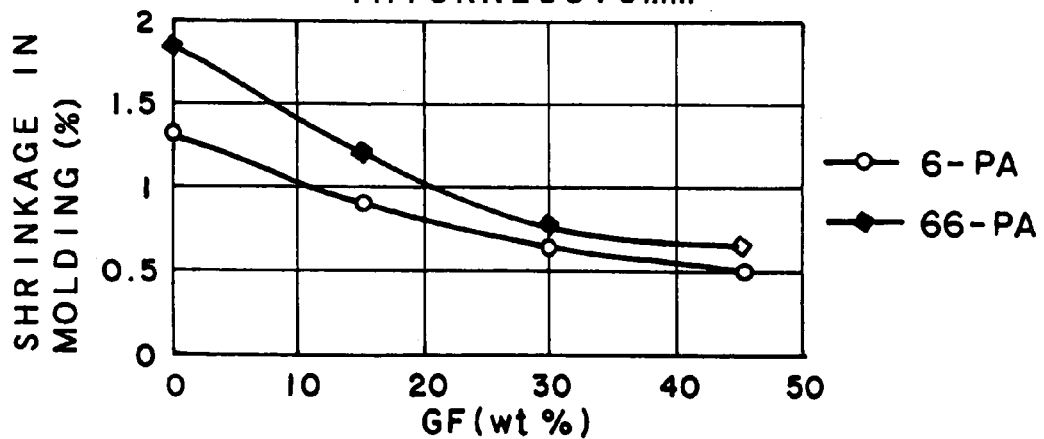
FIG. 8 is a graph showing relationships between shrinkage in molding (when the thickness of the molded object is about 3 mm) and contents of glass fibers (GF) in tank materials of 6-nylon (6-PA) resin and 66-nylon (66-PA) resin.

FIGS. 7 and 8 show relationships between the content of glass fibers (GF (wt %)) and the shrinkage in molding in 6-PA resin and 66-PA resin. As is demonstrated by FIGS. 7 and 8, despite the thickness of a molded product, the shrinkage in molding of 6-PA is less than the shrinkage in molding of 66-PA resin. Therefore, when a discharge tank having a complicated rib structure 14 is designed in order to improve the sound-proofing capbility, it is understood that 6-PA resin is more preferable than 66-PA resin because of its wider range of the temperature for molding and its reduced shrinkage during molding. Further, because 6-PA resin generally has superior molding properties to those of 66-PA resin, the molding property of 6-PA resin may not be adversely affected even if the 6-PA resin comprises a glass fibers in a content greater than that of 66-PA resin. Accordingly, in this embodiment, 6-PA resin comprising glass fibers in content of about 45 wt % is used as the material to form discharge tank 6.

When, as is demonstrated by FIG. 6, the specific gravity of 6-PA resin comprising glass fibers in a content of about 45 wt %, which is used as the material to form discharge tank 6 in this embodiment, is greater than the specific gravity of 66-PA resin comprising glass fibers in a content of about 30 wt %, which is used as the material to form introduction tank 5 in this embodiment. Moreover, because the cost of 6-PA resin is generally less than the cost of 66-PA resin, use of 6-PA resin as the material to form discharge tank 6 may achieve a cost reduction.

Thus, introduction tank 5 and discharge tank 6 are made of materials different from each other in this embodiment. In particular, the material used to form introduction tank 5 preferably has a higher thermal resistance because it receives high-temperature, charged gas. Thus, 66-PA resin comprising glass fibers in a content of about 30 wt %, which has a higher heat conductivity than the heat conductivity of 6-PA resin comprising glass fibers in a content of about 45 wt % used to form discharge tank 6, is used to form introduction tank 5. On the other hand, because discharge tank 6 requires a material having significant sound-proofing capability, rather than a thermal resistance; 6-PA resin comprising glass fibers in a content of about 45 wt %, which has a specific gravity greater than the specific gravity of 66-PA resin comprising glass fibers in a content of about 30 wt % that is used to form introduction tank 5, is used to form discharge tank 6. Therefore, while unnecessary increases in the cost for manufacturing intercooler 1 may be reduced or avoided, the properties desired for tanks 5 and 6, respectively, may be satisfied.

Although each of tanks 5 and 6 are formed from resins in this embodiment, one of the tanks may be formed from a metal, and the other tank may be made of a resin. Further, both tanks may be made from metals. Such alternative tank materials are chosen in accordance with the properties described above with respect to suitable resins.

While the invention has been described in connection with preferred embodiments, it will be understood by those skilled in the art that variations and modifications of the preferred embodiments described above may be made without departing from the scope of the invention. Other embodiments will be apparent to those skilled in the art from a consideration of the specification or from a practice of the invention disclosed herein. It is intended that the specification and the described examples are considered exemplary only, with the true scope of the invention indicated by the following claims.

What is claimed is:

1. A heat exchanger comprising:
   a heat exchange core;
   an introduction tank attached to said heat exchange core for introducing a heat transfer medium into said heat exchange core; and
   a discharge tank attached to said heat exchange core for receiving said heat transfer medium discharged from said heat exchange core,
   wherein said introduction tank is formed of a first material, said discharge tank is formed of a second material, a heat conductivity of the first material is greater than a heat conductivity of the second material, and a specific gravity of the first material is less than a specific gravity of the second material.

2. The heat exchanger of claim 1, wherein said introduction tank and said discharge tank are attached to said heat exchange core at ends of said heat exchange core opposite to each other.

3. The heat exchanger of claim 1, wherein at least one of said introduction tank and said discharge tank is made of a resin.

4. The heat exchanger of claim 3, wherein said resin is a polyamide.

5. The heat exchanger of claim 4, wherein said polyamide is an aliphatic polyamide.

6. The heat exchanger of claim 3, wherein said resin further comprises an inorganic material.

7. The heat exchanger of claim 6, wherein said inorganic material is a glass fiber.

8. The heat exchanger of claim 1, wherein said heat exchange core comprises a plurality of heat transfer tubes and fins, which are stacked alternately.

9. The heat exchanger of claim 1, wherein said heat exchanger is an intercooler, and said heat transfer medium is charged gas from a turbo-charger or a supercharger.

* * * * *